(12) United States Patent
Kameyama

(10) Patent No.: US 7,418,765 B2
(45) Date of Patent: Sep. 2, 2008

(54) GROMMET

(75) Inventor: Yasushi Kameyama, Hiroshima (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/421,935

(22) Filed: Apr. 24, 2003

(65) Prior Publication Data

US 2004/0016079 A1    Jan. 29, 2004

(30) Foreign Application Priority Data

Apr. 24, 2002    (JP) .............................. 2002-122341

(51) Int. Cl.
   *H02G 3/22*    (2006.01)
(52) U.S. Cl. .............................. 16/2.1; 16/2.2; 174/668; 174/659; 174/651
(58) Field of Classification Search .................... 16/2.1, 16/2.2 X, 2.5; 174/65 G, 152 G, 153 G, 74 R, 174/651 X, 659 X, 668 X; 248/56
   See application file for complete search history.

(56) References Cited

U.S. PATENT DOCUMENTS

| 3,141,062 | A | * | 7/1964 | Rapata | 174/153 G |
|---|---|---|---|---|---|
| 4,002,821 | A | * | 1/1977 | Satoh et al. | 174/153 G |
| 4,002,822 | A | * | 1/1977 | Kurosaki | 174/153 G |
| 5,243,139 | A | * | 9/1993 | Law | 174/153 G |
| 5,588,260 | A | * | 12/1996 | Suzuki et al. | 49/502 |
| 6,002,088 | A | * | 12/1999 | Ehmann | 174/65 G |
| 6,206,331 | B1 | * | 3/2001 | Keith et al. | 248/74.1 |
| 6,431,642 | B2 | * | 8/2002 | Sora et al. | 296/208 |
| 6,482,340 | B1 | * | 11/2002 | Davis et al. | 264/46.4 |
| 6,627,817 | B1 | * | 9/2003 | Kortenbach | 174/74 R |
| 6,660,937 | B1 | * | 12/2003 | MacLeod et al. | 174/65 G |

FOREIGN PATENT DOCUMENTS

| DE | 199 59 429 A1 | 6/2000 |
|---|---|---|
| JP | 1-90221 | 6/1989 |
| JP | 9-46848 | 2/1997 |
| JP | 2000-168466 | 6/2000 |

\* cited by examiner

*Primary Examiner*—Patricia Engle
*Assistant Examiner*—Mark Williams
(74) *Attorney, Agent, or Firm*—Sughrue Mion, PLLC

(57) ABSTRACT

A grommet includes a first grommet, having a first insertion hole through which a wire harness passes, an inner cover, having a second insertion hole communicated to the first insertion hole, the inner cover being mounted into the first grommet and a second grommet, mounted on the inner cover, and having a harness containing portion between the second grommet and the inner cover. A rib is provided on one of the inner cover and the second grommet. A rib bearing portion is provided on the another of the inner cover and the second grommet so as to be disposed to face to the rib. The wire harness disposed on the rib is pushed out from the rib by the rib bearing portion when the second grommet is mounted on the inner cover.

2 Claims, 6 Drawing Sheets

GROMMET

BACKGROUND OF THE INVENTION

The present invention relates to a grommet, which covers a harness extending between a door opening portion and a door in a vehicle and is mounted on the door opening portion and the door.

A grommet for vehicle doors is known as shown in FIG. 6. As shown in FIG. 6A, a grommet 60 for vehicle doors includes an outer grommet 61, an inner cover 62, and an inner grommet 63.

The outer grommet 61 is made of rubber, and includes a bellows portion (not shown) disposed on an end side of a body 64 to extend rearward in FIG. 6A, and a fitting portion on a side of a door panel to be disposed at a tip end of the bellows portion and to be mounted on the door panel. The bellows portion is communicated to a hole 65 of the inner cover 62. The body 64 is provided at an outer periphery thereof with an insertion portion 66, which permits the inner cover 62 to be inserted thereinto.

The inner cover 62 includes a plate portion 67 inserted into the insertion portion 66 of the outer grommet 61 and a rib 68 substantially centrally of the plate portion 67. The inner cover 62 is fitted onto the inner grommet 63.

An end of the inner grommet 63 on a right side in FIG. 6A is opened to permit a harness 69 to be taken out therethrough. An upper face of the inner grommet 63 is provided with a fitting portion, which is disposed on a side of an opening portion (not shown) to be mounted on a door opening.

As shown in FIG. 6B, formed between the inner cover 62 and the inner grommet 63 is a harness insertion portion 70, which is divided into two halves to interpose therebetween the rib 68 of the inner cover 62. The harness 69 is inserted through the harness insertion portion 70. A tip end of the rib 68 of the inner cover 62 is disposed close to the inner grommet 63.

With such grommet 60 for vehicle doors, the harness 69 disposed in a panel on the door opening extends through the harness insertion portion 70 between the inner cover 62 and the inner grommet 63 from an opened portion of the inner grommet 63 to be taken into a door panel through the bellows portion from the hole 65 of the inner cover 62 and through the fitting portion on a door panel side. And the fitting portion of the inner grommet 63 is fitted into and fixed to the door opening. The fitting portion on the door panel side is mounted on the door panel.

When the fitting portion of the inner grommet 63 is fitted into and fixed to the door opening portion, a load is applied through the outer grommet 61, and at this time the rib 68 of the inner cover 62 abuts against the inner grommet 63 to prevent the load from deforming or breaking the inner grommet 63.

With the grommet 60 for vehicle doors, shown in FIGS. 6A and 6B, however, when the inner grommet 63 is fitted onto the inner cover 62, a part of the harness 69 is in some cases interposed and disposed between the rib 68 of the inner cover 62 and the inner grommet 63 as shown in FIG. 6B.

In this state, when the inner grommet 63 is fitted into and fixed to the door opening portion, a load is applied toward the inner grommet 63 from the inner cover 62 through the outer grommet 61, so that a part of the harness 69 on the rib 68 interposes the engagement of the rib 68 and the inner grommet 63 therebetween since the part of the harness 69 is caught by the rib 68 and the inner grommet 63.

As a result, a part of the harness 69 will be collapsed and broken, and there is caused a problem that breakage of the harness 69 leads to cutting-off of an electric current supplied into the harness 69 to incur malfunctioning of electric equipments.

SUMMARY OF THE INVENTION

It is therefore an object of the present invention to provide a grommet for vehicle doors, capable of maintaining quality of a harness by preventing the harness from being caught.

The problems associated with the invention can be solved by grommets for vehicle doors, described in the following paragraphs 1) to 5).

1) A grommet, comprising:

a first grommet, having a first insertion hole through which a wire harness passes, an inner cover, having a second insertion hole communicated to the first insertion hole, the inner cover being mounted into the first grommet; and a second grommet, mounted on the inner cover, and having a harness containing portion between the second grommet and the inner cover, wherein a rib is provided on one of the inner cover and the second grommet;

wherein a rib bearing portion is provided on the another of the inner cover and the second grommet so as to be disposed to face to the rib; and wherein the wire harness disposed on the rib is pushed out from the rib by the rib bearing portion when the second grommet is mounted on the inner cover.

In the above configuration, even if a part of the harness disposed in the harness containing portion of the inner grommet is disposed on the rib when the inner grommet is mounted on the inner cover, the rib bearing portion causes the harness disposed on the rib to be moved from the rib, so that catch by the rib is prevented from occurring and the harness can be assembled without breakage. Therefore, it is possible to maintain quality of the harness.

2) Preferably, the rib bearing portion is formed with a rib insertion portion into which the rib is inserted.

In the above configuration, since the rib insertion portion, into which the rib is inserted, is formed on the rib bearing portion, the rib is surely inserted into the rib bearing portion while being guided by the rib insertion portion of the rib bearing portion, even if a part of the harness disposed in the harness taking-out portion of the inner grommet is disposed on the rib when the inner grommet is mounted on the inner cover.

Accordingly, since the rib bearing portion causes the harness disposed on the rib to be moved from the rib, catch by the rib is prevented from occurring and the harness can be assembled without breakage.

3) Preferably, the rib bearing portion is formed with a harness pressing portion having a inclined face.

In the above configuration, the harness pressing portion of the rib bearing portion pushes and moves the harness disposed on the rib to be able to shift the harness from the rib even if a part of the harness disposed in the harness containing portion of the inner grommet is disposed on the rib when the inner grommet is mounted on the inner cover.

Accordingly, catch by the rib is prevented from occurring and the harness can be assembled without breakage. Therefore, it is possible to maintain quality of the harness.

4) A grommet, comprising:

a first grommet, having a first insertion hole through which a wire harness passes, an inner cover, having a second insertion hole communicated to the first insertion hole, the inner cover being mounted into the first grommet; and a second grommet, mounted on the inner cover, and having a harness containing portion between the second grommet and the inner cover, wherein a rib is provided on one of the inner cover and the second grommet, and the rib is formed with a harness pressing portion having at least one inclined face such that the wire harness disposed on the rib is pushed out from the rib when the second grommet is mounted on the inner cover.

In the above configuration, even if a part of the harness disposed in the harness containing portion of the inner grommet is disposed on the harness pressing portion when the inner grommet is mounted on the inner cover, the harness pressing portion pushes out the harness, so that catch by the rib is prevented from occurring and the harness can be assembled without breakage. Therefore, it is possible to maintain quality of the harness.

5) Preferably, the harness pressing portion has a recess, and the wire harness disposed on the rib is pushed out from the rib to the recess along the inclined face when the second grommet is mounted on the inner cover.

In the above configuration, even if a part of the harness disposed in the harness containing portion of the inner grommet is disposed on the harness pressing portion when the inner grommet is mounted on the inner cover, the harness is moved toward the recess via the inclined faces from the rib, so that catch by the rib is prevented from occurring and the harness can be assembled without breakage. Therefore, it is possible to maintain quality of the harness.

6) Here, it is preferably that, the recess is formed by the inclined faces.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
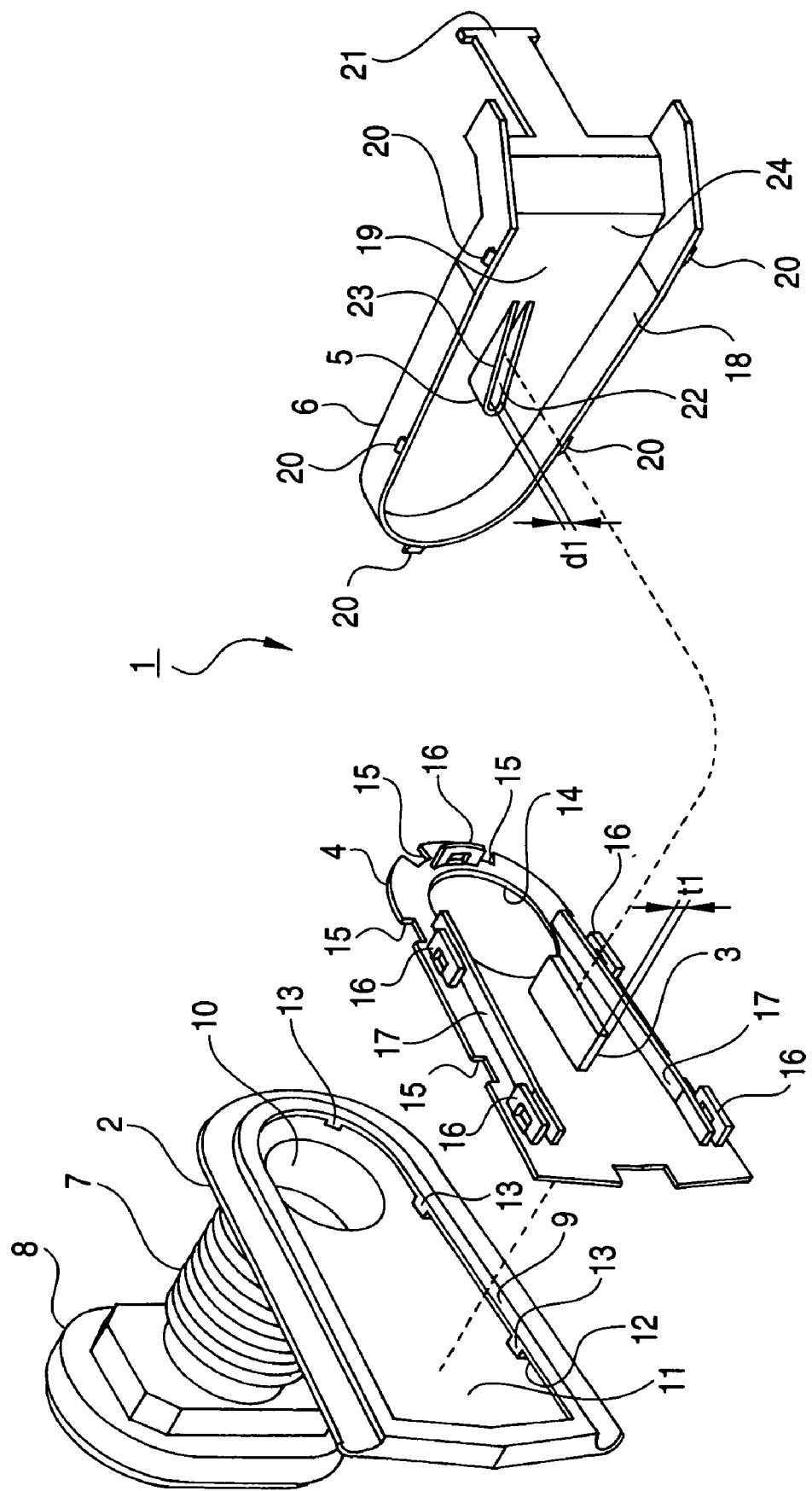
FIG. 1 is a perspective view illustrating an outer appearance of an assembling relationship of respective parts in a first embodiment of a grommet for vehicle doors, according to the invention.
Figure 2A:
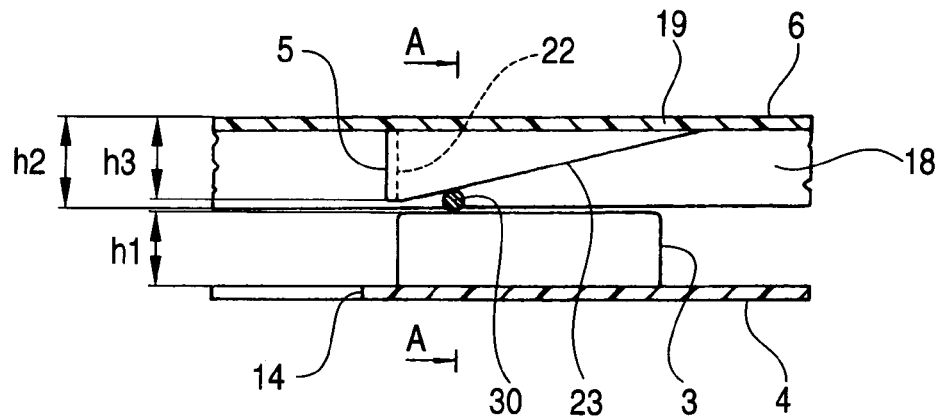
FIG. 2A is a cross sectional view showing an essential part at the time of assembling of an inner grommet and an inner cover, which are used in the grommet for vehicle doors, shown in FIG. 1.
Figure 2B:
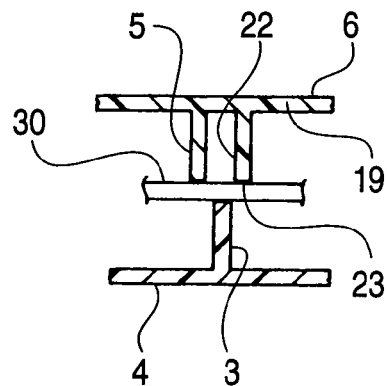
FIG. 2B is a cross sectional view taken along the line A-A in FIG. 2A.
Figure 2C:
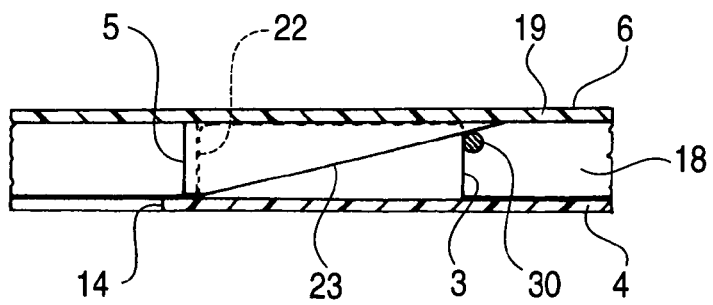
FIG. 2C is a cross sectional view showing an essential part at the time of completion of assembling of the inner grommet and the inner cover shown in FIG. 2A.

Embodiments of a grommet for vehicle doors, according to the invention, will be described below in detail with reference to FIGS. 1 to 5. FIG. 1 is a perspective view illustrating an outer appearance of an assembling relationship of respective parts in a first embodiment of a grommet for vehicle doors, according to the invention. FIG. 2A is a cross sectional view showing an essential part at the time of assembling of an inner grommet and an inner cover, which are used in the grommet for vehicle doors, shown in FIG. 1. FIG. 2B is a cross sectional view taken along the line A-A in FIG. 2A. FIG. 2C is a cross sectional view showing an essential part at the time of completion of assembling of the inner grommet and the inner cover shown in FIG. 2A.

Figure 3:
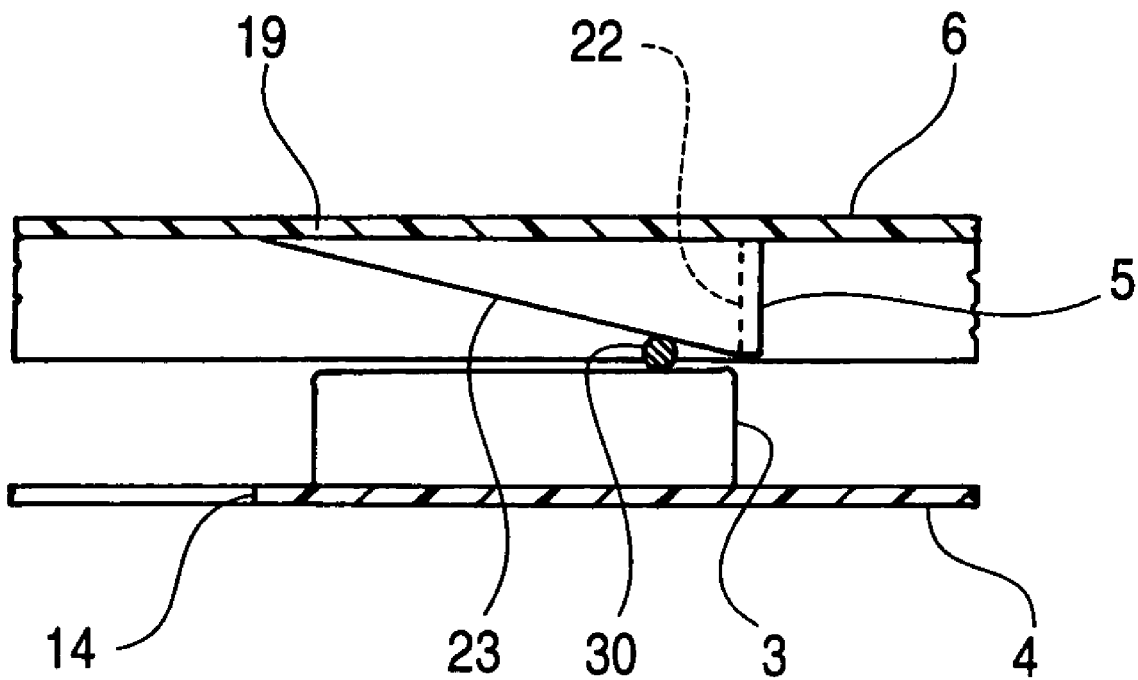
FIG. 3 is a cross sectional view showing an essential part at the time of assembling of an inner grommet and an inner cover in a second embodiment of a grommet for vehicle doors, according to the invention.
Figure 4A:
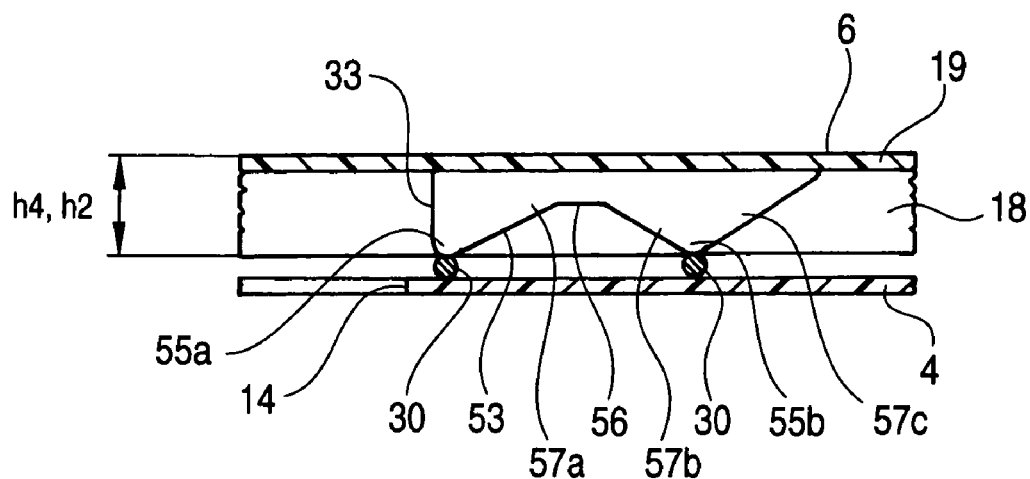
FIGS. 4A and 4B are cross sectional views showing an essential part at the time of assembling of an inner grommet and an inner cover in a third embodiment of a grommet for vehicle doors, according to the invention, FIG. 4A being a cross sectional view showing the essential part at the time of assembling of the inner grommet and the inner cover, and FIG. 4B being a cross sectional view showing the essential part at the completion of assembling of the inner grommet and the inner cover in FIG. 4A.
Figure 4B:
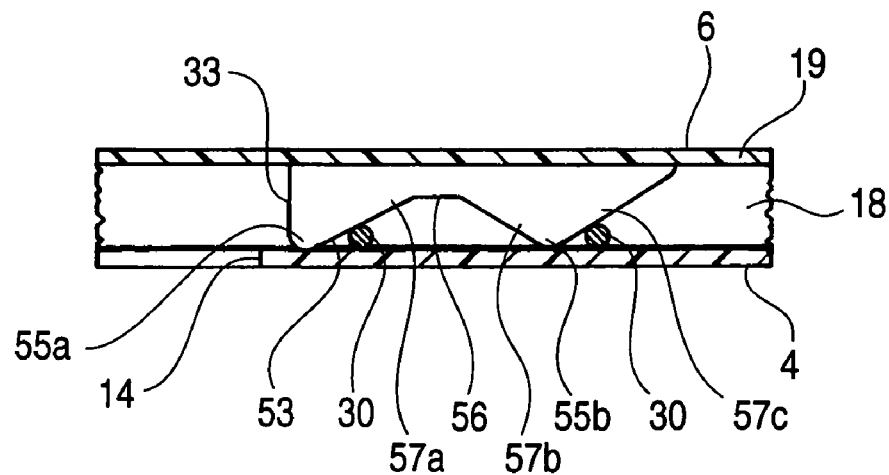
Figure 5A:
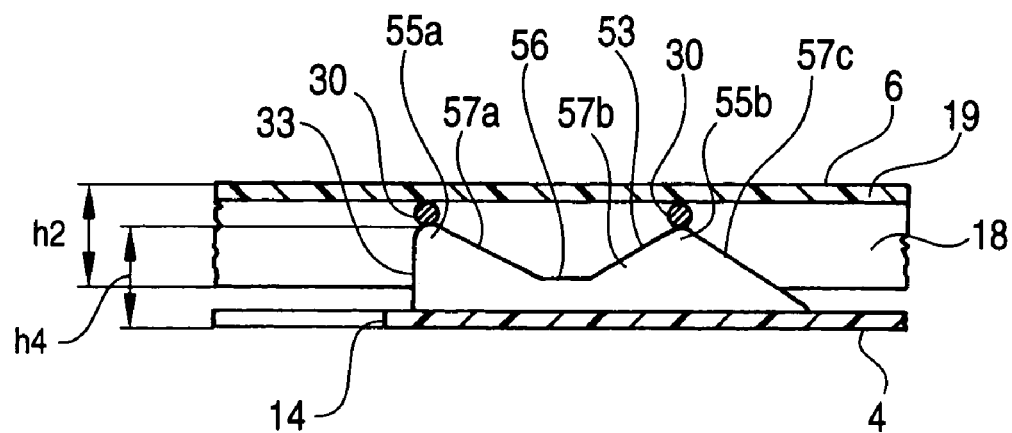
FIGS. 5A and 5B are cross sectional views showing an essential part at the time of assembling of an inner grommet and an inner cover in a fourth embodiment of a grommet for vehicle doors, according to the invention, FIG. 5A being a cross sectional view showing the essential part at the time of assembling of the inner grommet and the inner cover, and FIG. 5B being a cross sectional view showing the essential part at the completion of assembling of the inner grommet and the inner cover in FIG. 5A.
Figure 5B:
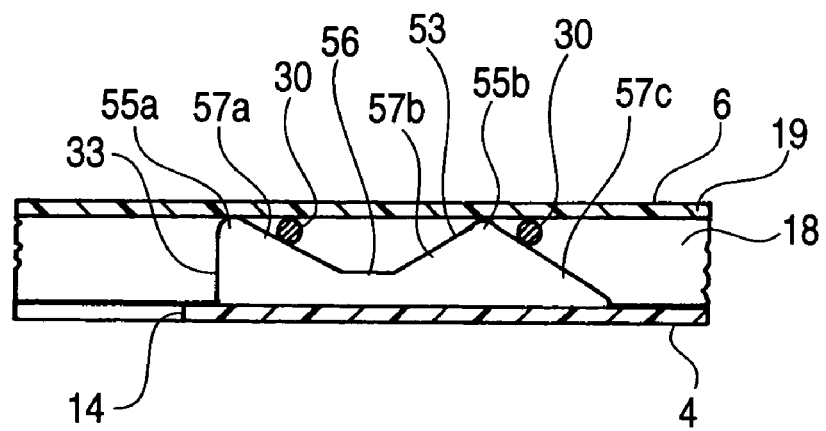
Figure 6A:
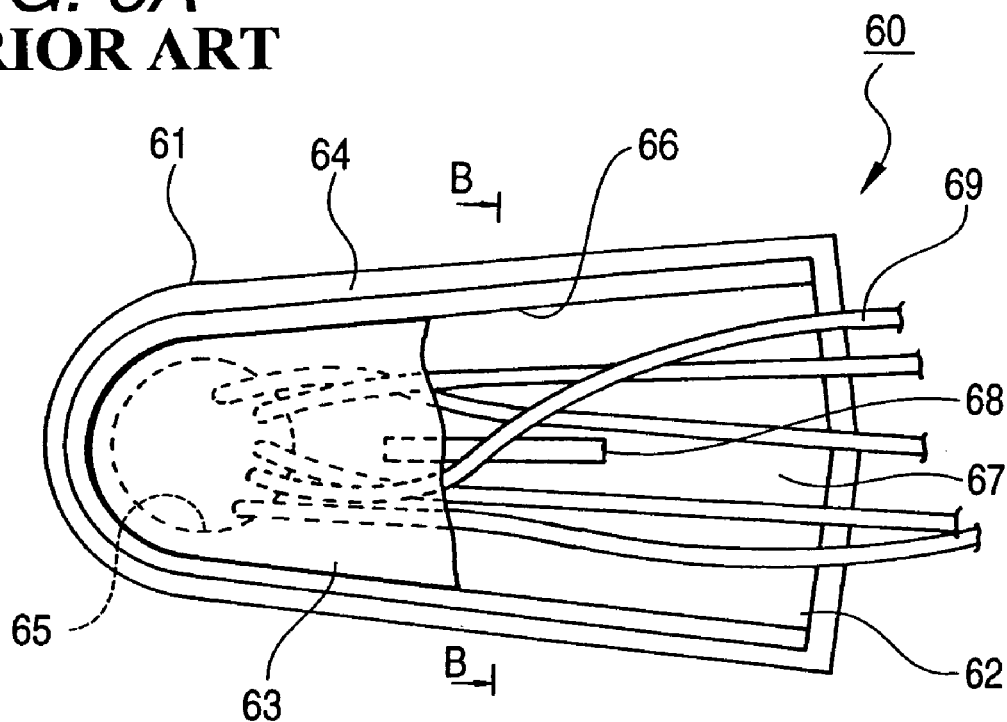
FIGS. 6A and 6B are related grommet for vehicle doors, FIG. 6A being a partially fragmentary, front view, and FIG. 6B being a cross sectional view taken along the line B-B in FIG. 6A.
Figure 6B:
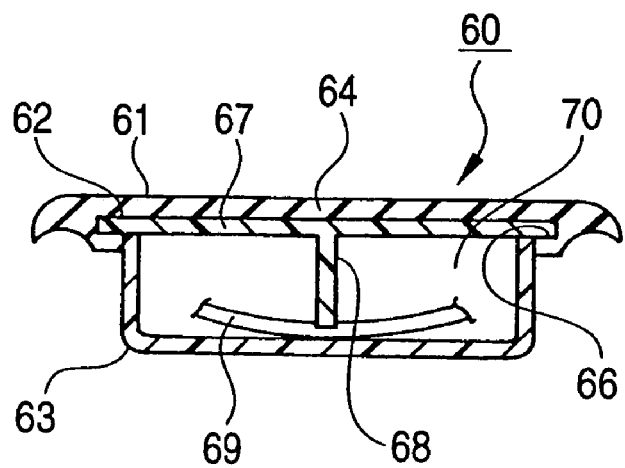

FIG. 3 is a cross sectional view showing an essential part at the time of assembling of an inner grommet and an inner cover in a second embodiment of a grommet for vehicle doors, according to the invention. FIG. 4A is a cross sectional view showing an essential part at the time of assembling of an inner grommet and an inner cover in a third embodiment of a grommet for vehicle doors, according to the invention. FIG. 4B is a cross sectional view showing the essential part at the completion of assembling of the inner grommet and the inner cover in FIG. 4A. FIG. 5A is a cross sectional view showing an essential part at the time of assembling of an inner grommet and an inner cover in a fourth embodiment of a grommet for vehicle doors, according to the invention. FIG. 5B is a cross sectional view showing the essential part at the completion of assembling of the inner grommet and the inner cover in FIG. 5A.

In addition, in the embodiments succeeding the first embodiment, members having the same constitution/function as that of members having already been described are denoted by the same or corresponding characters as those of the latter members and an explanation therefor is omitted.

As shown in FIG. 1, a grommet 1 for vehicle doors, according to the first embodiment, includes an outer grommet 2, an inner cover 4 formed with a rib 3, and an inner grommet 6 formed with a rib bearing portion 5.

The outer grommet 2 is made of rubber, and includes a bellows portion 7 disposed on an intermediate portion thereof, a door-side mount portion 8 disposed on an end thereof, a body 9 disposed on the other end thereof, and a harness insertion portion 10.

The bellows portion 7 is molded to be foldable in response to the opening and closing motion of a door when the grommet 1 for vehicle doors is arranged between a door opening portion (not shown) and the door. In addition, a space is present inside the bellows portion 7.

The door-side mount portion 8 is joined integrally to the bellows portion 7 at one end side of the bellows portion 7. The door-side mount portion 8 is fitted elastically into a mount hole (not shown) provided on the door. A space is also present inside the door-side mount portion 8.

The body 9 is joined integrally to the bellows portion 7 at the other end side of the bellows portion 7. The body 9 is plate-shaped to be semi-circular at one end side rightward in FIG. 1 and to be square at the other end side leftward in FIG. 1. The harness insertion portion 10 in the form of a round hole is formed on one end side of a plate portion 11 disposed centrally of the body 9. The harness insertion portion 10 is communicated and connected to an inside of the bellows portion 7 and an inside of the door-side mount portion 8. An inner cover insertion portion 12 is formed around the plate portion 11.

The inner cover insertion portion 12 is grooved to be similar to an outward form of the inner cover 4, and the inner cover 4 is received in the grooved portion to be fixed integrally to the body 9. Here, a plurality of projections 13 serving for positioning of the inner cover 4 are provided on a periphery of the inner cover insertion portion 12.

The inner cover 4 is plate-shaped to be semi-circular at one end side rightward in FIG. 1 and to be square at the other end side leftward in FIG. 1. A harness hole 14 is formed on one end side of the inner cover 4. The harness hole 14 is communicated to the harness insertion portion 10 of the outer grommet 2. Recesses 15 are formed on an outer periphery of the inner cover 4 to be positioned corresponding to the projections 13. The projections 13 on the inner cover insertion portion 12 of the outer grommet 2 are inserted into the recesses 15. The recesses 15 are the same in number as the projections 13.

Five inner grommet engaging portions 16 are projectingly formed on an inner peripheral side of the recesses 15 of the inner cover 4. A pair of guide plates 17 are projectingly formed on an inner peripheral side of the inner grommet engaging portions 16. The inner grommet engaging portions 16 are formed to be C-shaped. A side plate 18 provided on the inner grommet 6 is inserted between the inner grommet engaging portions 16 and the guide plates 17. And the inner grommet engaging portions 16 is latched to the inner grommet 6. Thereby, the inner grommet 6 is coveringly mounted on the inner cover 4.

The rib 3 is formed toward the other end of the harness hole 14 of the inner cover 4. The rib 3 is plate-shaped such as a square shape and provided upright on the inner cover 4. The rib 3 has a thickness dimension t1. A tip end of the rib 3 defines a plane in parallel to the inner cover 4. When the inner grommet 6 is fitted into and fixed to the door opening portion, a load is applied on the rib 3 through the outer grommet 2. At this time, the rib abuts against the inner grommet 6 to function to prevent the load from causing deformation and breakage of the inner grommet 6.

The inner grommet 6 includes a upper plate 19 having a shape similar to an outer form of the inner cover 4. The side plate 18 is provided on an outer periphery of the upper plate 19. Five projections 20 are formed on an end of the side plate 18 to be positioned corresponding to the inner grommet engaging portions 16. The projections 20 are engaged with the inner grommet engaging portions 16 of the inner cover 4.

The side plate 18 is curved at one end side thereof leftward in FIG. 1 and opened at the other end side thereof rightward in FIG. 1. A harness bundling portion 21 is formed on an end of the upper plate 19. The harness bundling portion 21 bends substantially at right angle relative to the upper plate 19 and extends. A fitting projection (not shown) is formed on an upper face of the upper plate 19. The fitting projection is fitted into a grommet fixing portion provided in the door opening portion.

The rib bearing portion 5 is projectingly formed substantially centrally of the upper plate 19. The rib bearing portion 5 is disposed on a lower face of the upper plate 19. The rib bearing portion 5 is shaped into a U-shape projection. A rib insertion portion 22 is formed inside of the rib bearing portion 5. The rib insertion portion 22 is set to have an inner-diameter dimension d1 slightly larger than the thickness dimension t1 of the rib 3 of the inner cover 4. Also, a projecting end of the rib bearing portion 5 is decreased in height toward a harness taking-out portion 24, which defines an end of the upper plate 19 as described later. In other words, a harness pressing portion 23 in the form of a ramp is formed to lower toward that side opposed to the harness hole, which is not a side toward the harness hole 14 when inserted into the inner cover 4.

Since the rib bearing portion 5 is disposed in a position opposed to the rib 3 of the inner cover 4, the rib 3 is inserted into the rib insertion portion 22 when the inner grommet 6 is inserted into the inner cover 4. At this time, the rib 3 is surely inserted into the rib insertion portion 22 since the rib insertion portion 22 guides the rib 3.

The inner grommet 6 is mounted on the inner cover 4 whereby the harness taking-out portion 24, which are divided into two halves by the rib 3 and the rib bearing portion 5, is formed between the inner grommet 6 and the inner cover 4.

A harness is bundled by the harness bundling portion 21 of the inner grommet 6 to extend through the harness taking-out portion 24 between the inner grommet 6 and the inner cover 4 to be drawn inside the bellows portion 7 and the door-side mount portion 8 through the harness insertion portion 10 of the outer grommet 2 from the harness hole 14 of the inner cover 4.

As shown in FIG. 2A, the rib 3 of the inner cover 4 has the height dimension h1. And the height dimension h1 of the rib 3 is slightly smaller than a height dimension h2 of the side plate 18 of the inner grommet 6. Also, a height dimension h3 of the rib bearing portion 5 is slightly smaller than that of the side plate 18.

When the inner grommet 6 is mounted on the inner cover 4, a part of a harness 30 disposed in the harness taking-out portion 24 (see FIG. 1) is arranged on the rib 3 and then the harness pressing portion 23 of the rib bearing portion 5 abuts against the harness 30 disposed on the rib 3.

As shown in FIG. 2B, the harness 30 disposed on the rib 3 is interposed between the rib 3 and the rib bearing portion 5. Since the harness pressing portion 23 of the rib bearing portion 5 defines a ramp, the ramp of the harness pressing portion 23 and a flat face of the rib 3 push and move the harness 30 toward the upper plate 19 of the inner grommet 6 (toward a side of the inner cover 4 opposed to the harness hole).

As shown in FIG. 2C, as mounting of the inner grommet 6 on the inner cover 4 proceeds, the harness pressing portion 23 pushes and moves the harness 30 further toward the upper plate 19. And when mounting of the inner grommet 6 on the inner cover 4 is completed, the rib 3 is received in the rib insertion portion 22 of the rib bearing portion 5 and the harness 30 is arranged in a position offset from the rib 3.

With the grommet 1 for vehicle doors, according to the first embodiment, the harness 30 is taken out through the harness insertion portion 10 of the outer grommet 2, which is communicated to the door-side mount portion 8 and the body 9 through the bellows portion 7, the harness hole 14 of the inner cover 4 coveringly mounted on the outer grommet 2, and the harness taking-out portion 24 of the inner grommet 6 coveringly mounted on the inner cover 4 and mounted on the door opening side.

The rib 3 is provided upright on the inner cover 4 to be directed toward the inner grommet 6. The rib bearing portion 5 is formed on the inner grommet 6 to be disposed facing the rib 3. The harness 30 disposed on the rib 3 is moved from the rib 3 when the inner grommet 6 is coveringly mounted on the inner cover 4.

Accordingly, even if a part of the harness 30 disposed in the harness taking-out portion 24 of the inner grommet 6 is disposed on the rib 3 when the inner grommet 6 is coveringly mounted on the inner cover 4, the rib bearing portion 5 causes the harness 30 disposed on the rib 3 to be moved from the rib 3, so that the catch by the rib 3 is prevented from occurring. Thereby, the harness 30 can be assembled without breakage of the harness 30.

Also, the rib insertion portion 22, into which the rib 3 can be inserted, is formed in the rib bearing portion 5.

Accordingly, even if a part of the harness 30 disposed in the harness taking-out portion 24 of the inner grommet 6 is disposed on the rib 3 when the inner grommet 6 is coveringly mounted on the inner cover 4, the rib 3 is surely inserted into the rib bearing portion 5 while being guided by the rib insertion portion 22 of the rib bearing portion 5.

Also, since the rib bearing portion 5 causes the harness 30 disposed on the rib 3 to be moved from the rib 3, catch by the rib 3 is prevented from occurring and the harness 30 can be assembled without breakage.

Also, the harness pressing portion 23 in the form of a ramp is formed on the rib bearing portion 5 so as to decrease in height toward a side of the inner cover 4 opposed to the harness hole.

Accordingly, even if a part of the harness 30 disposed in the harness taking-out portion 24 of the inner grommet 6 is disposed on the rib 3 when the inner grommet 6 is coveringly mounted on the inner cover 4, the harness pressing portion 23 of the rib bearing portion 5 causes the harness 30 disposed on the rib 3 to be pushed and moved toward a side of the inner cover 4 opposed to the harness hole 14, thus enabling shifting the harness from the rib 3.

As a result, catch by the rib 3 is prevented from occurring and the harness 30 can be assembled without breakage.

Next, an explanation will be given to a grommet for vehicle doors, according to a second embodiment of the invention.

As shown in FIG. 3, an inner grommet 6 used in the grommet for vehicle doors, according to the second embodiment, is formed with a rib bearing portion 5, which includes a harness pressing portion 23 in the form of a ramp so as to decrease in height toward that side of an inner cover 4 opposed to a harness hole 14, which corresponds to a side opposed to a harness taking-out portion 24 at the other end of a upper plate 19. A rib insertion portion 22 is formed inside of the rib bearing portion 5.

Since the rib bearing portion 5 is disposed in a position opposed to a rib 3 of an inner cover 4, the rib 3 is inserted into a rib insertion portion 22 when the inner grommet 6 is coveringly mounted on the inner cover 4. At this time, the rib 3 is surely inserted into the rib insertion portion 22 since the rib insertion portion 22 guides the rib 3.

With the second embodiment, the harness pressing portion 23 in the form of a ramp is formed on the rib bearing portion 5 so as to decrease in height toward a side of the inner cover 4 toward the harness hole 14.

Accordingly, even if a part of the harness 30 is disposed on the rib 3 when the inner grommet 6 is coveringly mounted on the inner cover 4, the harness pressing portion 23 of the rib bearing portion 5 causes the harness 30 disposed on the rib 3 to be pushed and moved toward the harness hole 14 of the inner cover 4, thus enabling shifting the harness from the fib 3.

As a result, catch by the rib 3 is prevented from occurring and the harness 30 can be assembled without breakage.

Next, an explanation will be given to a grommet for vehicle doors, according to a third embodiment of the invention.

As shown in FIG. 4A, with an inner grommet 6 and an inner cover 4, which are used in the grommet for vehicle doors, according to the third embodiment, a rib 33 are provided upright on the inner grommet 6. The rib 33 has a height dimension h4. The height dimension h4 of the rib 33 is equal to a height dimension h2 of a side plate 18 of the inner grommet 6.

When the inner grommet 6 is fitted into and fixed to the door opening portion, a load is applied on the rib through the outer grommet 61 (see FIG. 1). The rib 33 abuts against the inner grommet 6 so as to prevent the load from causing deformation and breakage of the inner grommet 6. A harness pressing portion 53 is formed on a tip end of the rib 33.

The harness pressing portion 53 includes a pair of projections 55a, 55b, a recess 56, and three inclined faces 57a, 57b, 57c. The recess 56 is continuous to the projections 55a, 55b with the inclined faces 57a, 57b therebetween. More specifically, the inclined face 57a lowers toward a bottom of the recess 56 from the projection 55a on a left end in FIG. 4A, the inclined face 57b rises toward the projection 55b from the recess 56, and the inclined face 57c lowers toward a upper plate 19 from the projection 55b. When the inner grommet 6 is mounted on the inner cover 4, the recess 56 has a gap having a sufficiently dimension at between the rib and the inner cover 4, and the gap is larger than a diameter of the harness 30.

When a part of the harness 30 disposed in the harness taking-out portion 24 (see FIG. 1) is arranged on the rib 33, especially, the part of the harness 30 is disposed on the projections 55a, 55b of the harness pressing portion 53 in assembling the inner grommet 6 to the inner cover 4, the harness 30 abuts against the projections 55a, 55b of the harness pressing portion 53 so as to be interposed between the harness pressing portion 53 and the inner cover 4.

As shown in FIG. 4B, when mounting of the inner grommet 6 coveringly on the inner cover 4 proceeds, the harness 30 abutted against the projections 55a, 55b of the harness pressing portion 53 is pushed out by the projections 55a, 55b and moved toward the recess 56 along the inclined faces 57a, 57b while being interposed between the inclined faces 57a, 57b and the inner cover 4.

When mounting of the inner grommet 6 on the inner cover 4 is completed, the harness 30 is arranged in a position toward the recess 56 and spaced from the projections 55a, 55b, and catch of the harness 30 by the rib 33 is prevented from occurring and the harness 30 can be assembled without breakage.

With the third embodiment, the rib 3 is provided upright toward the inner cover 4 on the inner grommet 6 which is coveringly mounted on the inner cover 4. The projections 55a, 55b and the recess 56 on the rib 33 are made continuous to each other by the inclined faces 57a, 57b, 57c. Also, the harness pressing portion 53 is formed on the rib 33. The harness pressing portion 53 causes the harness 30 on the projections 55a, 55b to be moved toward the recess 56 through the inclined faces 57a, 57b from the projections 55a, 55b when the inner grommet 6 is mounted on the inner cover 4.

Accordingly, if a part of the harness 30 disposed in the harness taking-out portion 24 of the inner grommet 6 is arranged on the projections 55a, 55b of the harness pressing portion 53 when the inner grommet 6 is mounted on the inner cover 4, the harness pressing portion 53 causes the harness 30 on the projections 55a, 55b to be moved to a position toward the recess 56 and spaced from the projections 55a, 55b.

As a result, catch of the harness 30 by the rib 33 is prevented from occurring and the harness 30 can be assembled without breakage.

Next, an explanation will be given to a grommet for vehicle doors, according to a fourth embodiment of the invention.

As shown in FIG. 5A, with an inner grommet 6 and an inner cover 4, which are used in the grommet for vehicle doors, according to the fourth embodiment of the invention. The rib 33 are provided upright on an inner cover 4. The rib 33 has a height dimension h4. The height dimension h4 of the rib 33 is equal to a height dimension h2 of a side plate 18 of an inner grommet 6. When the inner grommet 6 is fitted into and fixed to the door opening portion, a load is applied on the rib 33 through the outer grommet 2 (see FIG. 1). The rib abuts against the inner grommet 6 to prevent the load from causing deformation and breakage of the inner grommet 6. A harness pressing portion 53 is formed on a tip end of the rib 33.

The harness pressing portion 53 includes a pair of projections 55a, 55b, a recess 56, and inclined faces 57a, 57b, 57c. The recess 56 is continuous to the projections 55a, 55b with the inclined faces 57a, 57b therebetween. More specifically, the inclined face 57a lowers toward a bottom of the recess 56 from one projection 55a at a left end in FIG. 5A, the inclined face 57b rises toward the other projection 55b from the recess 56, and the inclined face 57c lowers toward the inner cover 4 from the other projection 55b. The recess 56 has a gap at between the rib 33 and a upper plate 19 of the inner grommet 6. The gap has a sufficiently larger dimension than a diameter of a harness 30 when the inner grommet 6 is mounted on the inner cover 4.

If a part of the harness 30 disposed in the harness taking-out portion 24 (see FIG. 1) is arranged on the rib 33 to be disposed on the projections 55a, 55b of the harness pressing portion 53 when the inner grommet 6 is coveringly mounted on the inner cover 4, the harness 30 abuts against the projections 55a, 55b of the harness pressing portion 53 to be interposed between the same and the upper plate 19 of the inner grommet 6.

As shown in FIG. 5B, when mounting of the inner grommet 6 coveringly on the inner cover 4 proceeds, the harness 30 abutted against the projections 55a, 55b of the harness pressing portion 53 is pushed out by the projections 55a, 55b and moved toward the recess 56 along the inclined faces 57a, 57b while being interposed between the inclined faces 57a, 57b and the upper plate 19 of the inner grommet 6. When mounting of the inner grommet 6 on the inner cover 4 is completed, the harness 30 is arranged in a position toward the recess 56 and spaced from the projections 55a, 55b, and catch of the harness 30 by the rib 33 is prevented from occurring. As a result, the harness 30 can be assembled without breakage.

With the fourth embodiment, the rib 33 is provided upright toward the inner grommet 6 on the inner cover 4, on which the inner grommet 6 is coveringly mounted. The projections 55a, 55b and the recess 56 on the rib 33 are made continuous to each other by the inclined faces 57a, 57b, 57c. The harness pressing portion 53 is formed causing the harness 30 disposed on the projections 55a, 55b to be moved toward the recess 56 through the inclined faces 57a, 57b from the projections 55a, 55b when the inner grommet 6 is coveringly mounted on the inner cover 4.

Accordingly, if a part of the harness 30 disposed in the harness taking-out portion 24 of the inner grommet 6 is arranged on the projections 55a, 55b of the harness pressing portion 53 when the inner grommet 6 is coveringly mounted on the inner cover 4, the harness pressing portion 53 can cause the harness 30 disposed on the projections 55a, 55b to be moved to a position spaced from the projections 55a, 55b.

As a result, catch of the harness 30 by the rib 33 is prevented from occurring and the harness 30 can be assembled without breakage.

In addition, the grommet for vehicle doors, according to the invention, is not limited to the above embodiments but is susceptible to appropriate modification, improvement, and the like. For example, a rib may be provided on an inner grommet and a rib bearing portion may be provided on an inner cover.

Also, it suffices that length dimensions of a rib and a rib bearing portion be appropriately selected.

The harness pressing portion 53 in the third and fourth embodiments may be shaped to assume a continuous curved configuration or a saw-tooth configuration, and a height of the projections 55 may be appropriately selected corresponding to a wire diameter of the harness 30.

What is claimed is:

1. A grommet, comprising:
   a first grommet, having a first insertion hole through which a wire harness passes,
   an inner cover, having a second insertion hole communicated to the first insertion hole, the inner cover being mounted to the first grommet; and
   a second grommet, mounted on the inner cover, and having a harness containing portion between the second grommet and the inner cover,
   wherein a rib is provided on one of the inner cover and the second grommet;
   wherein a rib bearing portion is provided on the other of the inner cover and the second grommet so as to be disposed to face to the rib; and
   wherein the wire harness disposed on the rib is pushed out from the rib by the rib bearing portion when the second grommet is mounted on the inner cover;
   wherein the rib bearing portion is formed with a rib insertion portion into which the rib is inserted.

2. The grommet as set forth in claim 1, wherein the rib bearing portion is formed with a harness pressing portion having a inclined face.

* * * * *